United States Patent [19]

Chiba

[11] 3,821,493

[45] June 28, 1974

[54] ADAPTIVE ECHO CANCELLER USING THE GRADIENT METHOD AND HAVING CORRELATOR MEANS

[75] Inventor: Seibi Chiba, Tokyo, Japan

[73] Assignee: Nippon Electric Company, Limited, Tokyo, Japan

[22] Filed: May 8, 1972

[21] Appl. No.: 250,973

[30] Foreign Application Priority Data

May 15, 1971 Japan .............................. 46-32651

[52] U.S. Cl. .............................. 179/170.2

[51] Int. Cl. .............................. H04b 3/20

[58] Field of Search .............................. 179/170.2

[56] References Cited

UNITED STATES PATENTS

| | | | |
|---|---|---|---|
| 3,499,999 | 3/1970 | Sondhi | 179/170.2 |
| 3,588,385 | 6/1971 | Moye | 179/170.2 |
| 3,660,619 | 5/1972 | Chiba | 179/170.2 |
| 3,732,410 | 5/1973 | Mackechnie | 179/170.2 |

*Primary Examiner*—Kathleen H. Claffy
*Assistant Examiner*—Alan Faber
*Attorney, Agent, or Firm*—Ostrolenk, Faber, Gerb & Soffen

[57] ABSTRACT

An adaptive echo canceller having an echo path model, means for subtracting the echo path model output from the output of the actual echo path, and means for adaptively controlling the echo path model in compliance with the amount of adjustment determined according to the gradient method, wherein the adaptive control means comprises correlator means for controlling the amount of adjustment in accordance with the measure of correlation between the input of the echo path model and the output of the subtracting means.

6 Claims, 3 Drawing Figures

ADAPTIVE ECHO CANCELLER USING THE GRADIENT METHOD AND HAVING CORRELATOR MEANS

BACKGROUND OF THE INVENTION

This invention relates to an adaptive echo canceller using the gradient method. Such an echo canceller is particularly useful for use at a junction between a four-wire and a two-wire circuit in a telephone network.

In parallel with the hybrid circuit installed at each junction between the four-wire and the two-wire circuits, it is conventional to use an echo suppressor, such as referred to in U.S. Pat. No. 3,465,106 to Nagata et al., for detecting which of the signals incoming along a one-way path of the four-wire circuit to the junction and outgoing therefrom along the other one-way path is larger and for disconnecting the outgoing one-way path when the incoming signal is not larger than the outgoing one. Because of the known defects of the conventional echo suppressors, various echo suppressors of the cancellation type, or echo cancellers, are being substituted therefor. As taught in U.S. Pat. No. 3,465,106 cited above, an echo suppressor of this type has an echo path model and means for subtracting the echo path model output from the outgoing signal. In U.S. Pat. No. 3,499,999 to Sondhi and in a pending U.S. Pat. application Ser. No. 877,887 filed Nov. 19, 1969, by Chiba et al., now U.S. Pat. No. 3,660,619, an adaptive echo canceller using the gradient method is disclosed wherein the echo path model is adaptively controlled by the cancellation error, or the residual echo, so as to minimize the cancellation error as will later be outlined with reference to FIG. 1 of the accompanying drawings. Echo cancellers, particularly those of the adaptive type, are preferred to the sophisticated echo suppressors because the former in general will not unduely interrupt the speech signal transmitted from the two-wire circuit to the outgoing one-way path through the junction. It should, however, be pointed out that the conventional adaptive echo cancellers will lose their cancellation capability when the speech signal of relatively high level is superposed during the double talk on the echo signal having leaked from the incoming one-way path to the outgoing path through the hybrid circuit.

According to U.S. Pat. No. 3,499,999 referred to above, an adaptive echo canceller using the gradient method is revealed wherein means is provided for examining the relative levels of signals in the incoming and the outgoing one-way paths and suspending the adaptive control exerted by the cancellation error on the echo path model. It is, however, desirable not to interrupt the adaptive control on the echo path model even when the outgoing signals are of relatively high levels.

SUMMARY OF THE INVENTION

It is therefore an object of the present invention to provide an adaptive echo canceller capable of carrying out the best possible echo cancellation by the gradient method even during presence of the double talk.

It is another object of this invention to provide an adaptive echo canceller using the gradient method in which the echo path model is least disturbed even in the presence of the double talk.

According to this invention there is provided an echo canceller for cancelling the echo signal appearing on the output side of an echo path in response to an incoming signal, said canceller having an echo path model means including means for storing approximated characteristics of said echo path and means for processing said incoming signal in compliance with said approximated characteristics, means for subtracting the echo path model output from the output of said echo path, first correlator means responsive to said incoming signal and the output of said subtracting means for successively deriving signals representing amounts of adjustment of said approximated characteristics, and means for adaptively controlling said approximated characteristics in compliance with said amounts of adjustment, wherein the improvement comprises second correlator means for controlling said amounts of adjustment in accordance with the measure of correlation between said incoming signal and said subtracting means output.

In the case of a junction between a four-wire and a two-wire circuit, the echo path is provided by the hybrid circuit or network interconnecting the two-wire circuit and the two one-way paths of the four-wire circuit.

BRIEF DESCRIPTION OF THE DRAWINGS

FIG. is a block diagram of a conventional adaptive echo canceller using the gradient method.

DESCRIPTION OF A PREFERRED EMBODIMENT

Figure 1:
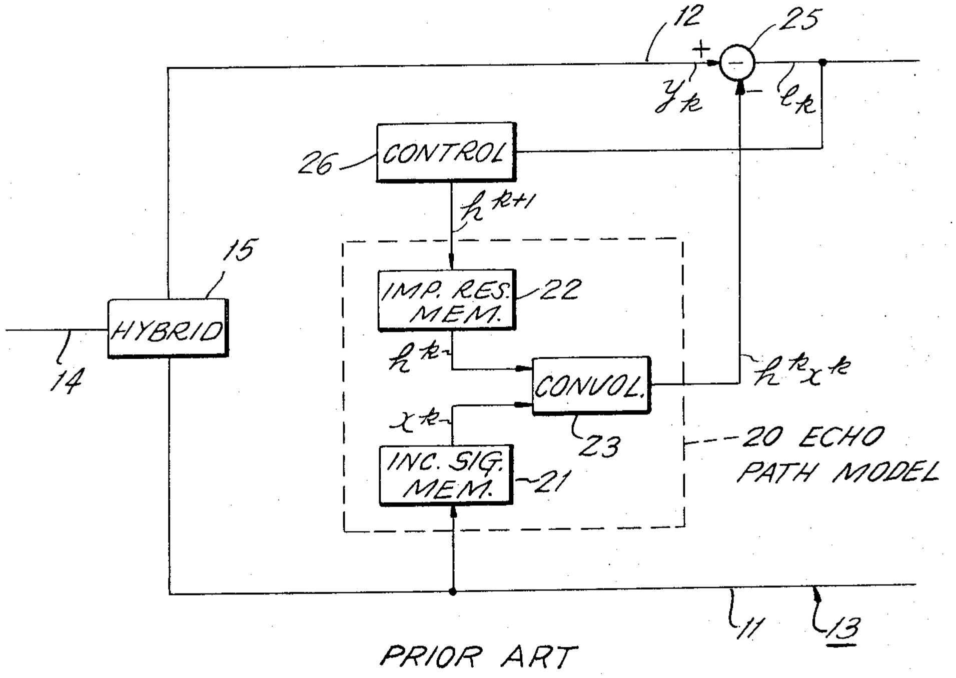
PRIOR ART FIG. 1

Referring to FIG. 1, a conventional adaptive echo canceller using the gradient method bridges an incoming and an outgoing one-way path 11 and 12 of a four-wire circuit 13 connected to a two-wire circuit 14 through hybrid circuit 15, which delivers in practice a fraction of the incoming signal to the outgoing path 12 as the echo signal. The echo canceller comprises an echo path model 20 comprising in turn an incoming signal memory 21 connected to the incoming path 11 for storing a predetermined number of incoming signal samples $x^k(x_{k-n+1}, x_{k-n+2}, \ldots x_k)$ having been transmitted through the incoming path 11 up to a sampling time $k$, an impulse response memory 22 for storing a like number of impulse responses $h^k(h_{k-n+1}, h_{k-n+2}, \ldots h_k)$ in the manner later described, and a convolution computer 23 connected to the incoming signal and the impulse response memories 22 and 23 for calculating the convolution $h^k \cdot x^k$ of the incoming signal samples and the impulse response characteristics. The incoming signal samples may be regarded as an $n$-dimensional row vector. The convolution produced by the echo path model 20 is a synthesized echo signal. The echo canceller further comprises a subtracting circuit 25 interposed in the outgoing path 12 for subtracting the convolution from the outgoing signal $y_k$ sent thereto from the hybrid circuit 15 at the time point $k$ to deliver in theory an echo free outgoing signal through the remaining portion of the outgoing path 12. The signal sent to the subtracting circuit 25 from the hybrid circuit 15 may be considered to be the output signal of the actual echo path including the hybrid circuit 15. The echo canceller still further comprises an adaptive control unit 26 connected to the output side of the subtracting circuit 25 for rewriting the impulse response characteristics stored in the memory 22 in compliance with the cancellation error $e_k(=y_k-h^k \cdot x^k)$ so as to reduce the cancellation error. The operation of the closed loop comprising the impulse response memory 22, the convolution computer 23, the subtracting circuit 25, and the adaptive control unit 26 is thus made to converge. More particularly, the rewriting of the impulse response characteristics is carried out in the absence of the double talk by putting the old impulse responses $h^k$ out of the memory 22 and putting therein new impulse responses $h^{k+1}$ given by $$h^{k+1}=h^k+a^k \cdot (x^k)^T \cdot e_k / \|x^k\|^2, \quad (1)$$

where $a^k$ is a factor for adjustment, $T$ represents the transpose of a vector, and $\|x^k\|$ is the usual Euclidean norm of a vector $x^k$. It is known that the algorithm of Equation 1 for adjustment converges when $$0<a^k<2$$

and that the cancellation error becomes zero thereby putting an end to the adjustment of the impulse response characteristics and keeping the loop in the state of convergence.

As was described hereinabove, the Euclidean norm of a vector is a sum of the squares of the vector components. The control unit 26 produces the new impulse response $h^{k+1}$ given in Equation 1 as shown by the output of summing circuit 46 in FIG. 3. More particularly, the control unit 26 comprises first means (see multiplier 31 of FIG. 3) for calculating a sum of the products of the cancellation error $e_k$ and the incoming signal vector components $(x_{k-n+1}, x_{k-n+2}, \ldots x_k)$, which in effect is a correlator. Furthermore, the term "gradient method" as used in connection with an echo canceller is defined as a method used to successively adjust the impulse response ($h$ of the echo path model) by adding thereto the sum just mentioned (see summing circuit 46 — FIG. 3). Incidentally, a transpose of a row vector is a column vector having the same vector components.

In the presence of double talk, the signal $y_k$ applied to the subtracting circuit 25 by the hybrid circuit 15 at a time point $k$ is the sum of the echo signal $y_k'$ produced by the incoming signal $x^k$ plus the speech signal $u_k$ transmitted from the two-wire circuit 14 through the hybrid circuit 15. It will therefore be understood that an overshoot of $a^k \cdot (x^k)^T \cdot u_k / \|x^k\|^2$ occurs in the adjustment to disturb the state of convergence. In accordance with the instant invention, the correlation $\phi_{x.e}{}^k$ between a predetermined plurality of the incoming signal vectors and an equal plurality of the cancellation errors including the speech signal samples is calculated as follows:

$$\begin{aligned}\phi^k_{x.e} &= \sum_{j=0}^{m-1} (x^{k-j})^T \cdot e_{k-j}/\|x^{k-j}\|^2 \\ &= \sum_{j=0}^{m-1} (x^{k-j})^T \cdot (y'_{k-j}+u_{k-j}-h^{k-j} \cdot x^{k-j})/\|x^{k-j}\|^2 \\ &= \sum_{j=0}^{m-1} (x^{k-j})^T \cdot (y'_{k-j}-h^{k-j} \cdot x^{k-j})/\|x^{k-j}\|^2 \\ &\quad + \sum_{j=0}^{m-1} (x^{k-j})^T \cdot u_{k-j}/\|x^{k-j}\|^2, \quad (2)\end{aligned}$$

where $m$ is predetermined number. The first term becomes zero after the operation of the loop has converged. The second term in the right hand side of Equation 2 is the correlation between the incoming signal and the signal in the two-wire circuit 14 and consequently tends to zero for a sufficiently large number of $m$ such as $m$=1,000. It is thus appreciated that, after the convergence is once brought about, the correlation between the incoming signal and the subtracting circuit output is always zero even in the presence of the double talk and that this correlation serves as a measure for the state of convergence of the operation of the loop. In this connection it is to be noted that the signals $x$, $y$, $u$, and $e$ may be regarded as zero for the negative and zero sampling time points and that Equation 2 is significant in practice when the sampling time $k$ is appreciably greater than the predetermined number $m$.

Figure 2:
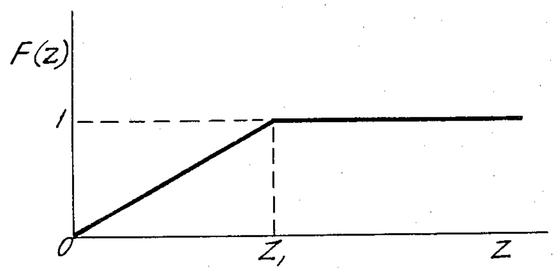
FIG. 2 is a graph for explaining the principles of the instant invention.

According to a preferred embodiment of this invention, the factor $a^k$ in Equation 1 is given by a nonlinearly increasing function $$a^k=bF(z) \quad (3)$$

where $$0<b<2,$$
$$z=\|\phi^k_{x.e}\|,$$
$$F(z)=0 \quad \text{for } z=0,$$

and $$F(z)=1 \quad \text{for } z \geqq z_1$$

as shown in FIG. 2. Such selection of the factor in Equation 1 allows the impulse response characteristics stored in the echo path model 20 to remaim unadjusted in effect after the sufficient convergence of the loop, thereby preventing occurrence of the undesired disturbance which would otherwise be caused to the loop convergence, or the stored impulse response characteristics, by the double talk.

Figure 3:
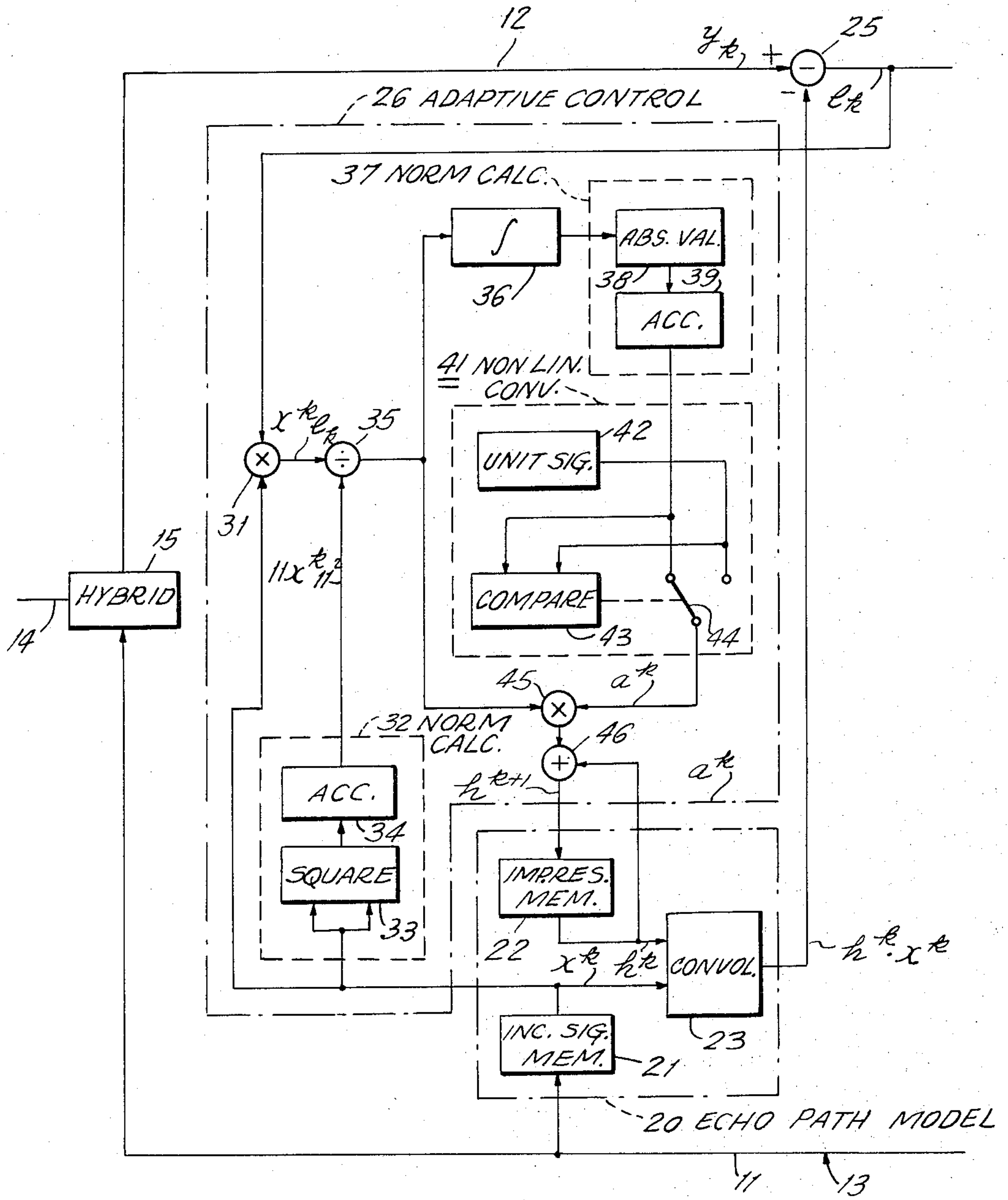
FIG. 3 is a block diagram of an embodiment of this invention.

Referring to FIG. 3, an embodiment of the present invention comprises circuit units similar to those illustrated in conjunction with the conventional echo canceller shown in FIG. 1 wherein like elements are designated by the same reference numerals. The adaptive control unit 26 comprises a first multiplier 31 supplied with the contents $x^k$ of the incoming signal memory 21 and the output $e_k$ of the subtracting circuit 25 for producing the product $x^k \cdot e_k$; and an input signal norm computer 32 having in turn a multiplier 33 responsive to the successive samples $x^k$ of the incoming signal for calculating the squares of the samples and an accumulator 34 for storing the successively calculated squares. The control unit 26 further comprises a divider 35 for dividing the output of the first multiplier 31 with the output of the norm computer 32, an integrator 36 for integrating the quotient to derive the right hand side Equation 2, or the measure of correlation between the incoming signal and the subtracting circuit output, and a correlation norm computer 37 having in turn an absolute value computer 38 for successively calculating the absolute values of the integrals and an accumulator 39 for storing the successive integrals. The control unit 26 still further comprises a nonlinear converter 41 responsive to the integral for producing the value of the function given by Equation 3 for a selected value of $z_1$. The converter 41 comprises a unit signal generator 42, a comparator 43 for comparing the integral with the unit signal, and switching unit symbolically shown by a switch 44 for respectively connecting either the integral or the unit signal to the output terminal of the converter 41 when the integral is or is not smaller than the unit signal. As is readily understood from the context, the unit signal generator 42 always produces a digital-encoded signal representative of the value 1. The control unit 26 yet further comprises a second multiplier 45 responsive to the factor $a^k$ developed at the output of the converter 41 and the quotient supplied from the divider 35 for deriving the second term in the right hand side of Equation 1 for the present case; and an adder 46 supplied with the contents $h^k$ of the impulse response memory 22, or the first term in the right hand side of Equation 1 for this case, for supplying the new impulse response characteristics $h^{k+1}$ to the impulse response memory 22. The period for sampling the incoming signal may be 100 microseconds. The memories 21 and 22 and the accumulators may store about 100 samples.

It will now be seen that the embodiment illustrated above makes use of an echo path model 20 of the above-described conventional echo canceller wherein the echo path model makes use of an impulse response model with the actual echo path being regarded as a linear circuit whose transfer function is capable of being represented by the impulse response characteristics and that it is possible to equally well apply the instant invention to an adaptive echo canceller using the gradient method wherein the echo path model makes use of a rational function model with the actual echo path transfer function being simulated by a suitable number of poles and zeros, or a frequency region model with the transfer function being approximated by the amplitudes and the phases in the frequency region given by conversion of the characteristics of the actual echo path, or any of the like models.

What is claimed is:

1. An echo canceller for cancelling the echo signal appearing on the output side of an echo path in response to an incoming signal, said canceller having an echo path model means including means for storing approximated characteristics of said echo path and means for processing said incoming signal in compliance with said approximated characteristics, means for subtracting the echo path model output from the output of said echo path, first correlator means responsive to said incoming signal and the output of said subtracting means for successively deriving signals representing amounts of adjustment of said approximated characteristics, and means for adaptively controlling said approximated characteristics in compliance with said amounts of adjustment, wherein the improvement comprises second correlator means for controlling said amounts of adjustment in accordance with the measure of correlation between said incoming signal and said subtracting means output.

2. An echo canceller as claimed in claim 1, wherein said second correlator means comprises:

a correlation computer responsive to a series of samples of said incoming signal $(x^{k-j})^T$ and said subtracting means output $e_{k-j}$ for deriving a measure of correlation $\phi_{x,e}{}^k$ between said incoming signal and said subtracting means output, said samples of said incoming signal having been sampled up to a sampling time $k$ represented as a positive integral multiple of a sampling period, $j$ being an integer which is not negative, said measure of correlation being given by $$\phi^k_{x,e} = \sum_{j=0}^{m-1} (x^{k-j})^T \cdot e_{k-j} / \|x^{k-j}\|^2,$$

where $m$ is a predetermined positive integer and $\|x^k\|$ represents the Euclidean norm of the vector $x^k$ and $(x^k)^T$ represents the transform of the vector $x^k$, means coupled to said correlation computer for calculating the amount of adjustment which is determined $$b \cdot F(\|\phi_x \cdot e^k\|) \cdot (x^k)^T e_k / \|x^k\|^2 :$$

where $b$ is a positive number between zero and two, $F(z)$ is a nonlinearly increasing function of a nonnegative variable $z$ which herein is $\|\phi_x \cdot e^k\|$, said function being respectively equal to zero and one for $z=0$ and $z \geq z_1$, where $z_1$ is a predetermined positive number, and means coupled to said calculating means for updating said approximated characteristics in accordance with said amount of adjustment.

3. In a two-wire/four-wire equipment comprising a two-wire circuit, a four-wire circuit having a receive line and an output line and hybrid means coupling said four-wire circuit to said two-wire circuit, an echo canceller employed in the two-wire/four-wire equipment and coupled to said receive and output lines for cancelling the echo signal appearing on the output side of an echo path coupling the four-wire receive line to the two-wire equipment developed as a result of an incoming signal on the receive line and which is transmitted to the two-wire equipment and then through the output line of the four-wire circuit, comprising an echo path model means responsive to said incoming signal and signals representative of approximated characteristics of said echo path stored therein for producing a synthesized echo signal, means for subtracting said synthesized echo signal from the output of said echo path to produce a cancellation error signal, correlator means responsive to said incoming signal and said cancellation error signal for deriving a correction signal, integrator means for integrating said correction signal to produce an integrated signal, means for comparing said integrated signal with a reference signal to produce as an output signal said integrated signal when said integrated signal is smaller than said reference signal, or said reference signal when said integrated signal is larger than said reference signal, and means for adding the last-mentioned output signal to said signals representative of said approximated characteristics.

4. The echo canceller of claim 3 wherein said correlator means comprises squaring means for squaring said incoming signals, accumulator means for summing the outputs of said squaring means;

first product generating means for forming a product of said incoming signals and said error signal;

divider means for dividing the output of said product generating means by the output of said accumulator means.

5. The echo canceller of claim 4 further comprising second product forming means for forming a product of the output of said divider means and the output of said comparing means, the output of said second product forming means being coupled to said summing means.

6. The echo canceller of claim 3 further comprising means coupled to said integrator means for deriving the absolute value of the output of said integrator means;

means for accumulating the outputs of said absolute value deriving means.

* * * * *